(12) United States Patent
Kluge et al.

(10) Patent No.: US 11,268,597 B2
(45) Date of Patent: Mar. 8, 2022

(54) AUTOMATIC TRANSMISSION FOR A MOTOR VEHICLE AND METHOD FOR SHIFTING AN AUTOMATIC TRANSMISSION

(71) Applicant: Bayerische Motoren Werke Aktiengesellschaft, Munich (DE)

(72) Inventors: Benjamin Kluge, Munich (DE); Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 22 days.

(21) Appl. No.: 16/827,333

(22) Filed: Mar. 23, 2020

(65) Prior Publication Data

US 2020/0217399 A1    Jul. 9, 2020

Related U.S. Application Data

(63) Continuation of application No. PCT/EP2018/072467, filed on Aug. 21, 2018.

(30) Foreign Application Priority Data

Sep. 26, 2017   (DE) ..................... 10 2017 217 133.2

(51) Int. Cl.
*F16H 3/72*     (2006.01)
*F16H 63/30*    (2006.01)

(52) U.S. Cl.
CPC ............. *F16H 3/728* (2013.01); *F16H 63/30* (2013.01); *F16H 2063/3093* (2013.01); *F16H 2200/2007* (2013.01); *F16H 2200/2094* (2013.01)

(58) Field of Classification Search
CPC ...... F16H 2200/2005–2017; F16H 2200/2094; F16H 2200/2064; F16H 37/084–2037/104; B60K 6/387
See application file for complete search history.

(56) References Cited

U.S. PATENT DOCUMENTS 8,308,593 B2   11/2012   Kumazaki et al.
9,896,084 B2   2/2018   Iwase
(Continued)

FOREIGN PATENT DOCUMENTS

DE          10248400 A1 *   4/2004   ........... F16H 37/084
DE   10 2007 044 107 A1    3/2009
(Continued)

OTHER PUBLICATIONS

PCT/EP2018/072467, International Search Report dated Nov. 26, 2018 (Two (2) pages).
(Continued)

*Primary Examiner* — Ernesto A Suarez
*Assistant Examiner* — Lillian T Nguyen
(74) *Attorney, Agent, or Firm* — Crowell & Moring LLP

(57) ABSTRACT

An automatic transmission for a motor vehicle having an internal combustion engine includes at least two fixed gear ratios, a transmission shaft, a planetary gearbox, a shaft, two shift elements, and a variator. A first side of the variator can be coupled to the transmission shaft for torque transmission and a second side of the variator can be coupled to the planetary gearbox via the shaft in order to adjust the gear ratio.

9 Claims, 4 Drawing Sheets

(56) References Cited

U.S. PATENT DOCUMENTS

| | | | | |
|---|---|---|---|---|
| 2008/0254928 A1* | 10/2008 | Pichon | ................... | B60K 6/387 |
| | | | | 475/5 |
| 2011/0165986 A1 | 7/2011 | Hoffman et al. | | |
| 2012/0220411 A1 | 8/2012 | Yang | | |
| 2017/0299022 A1* | 10/2017 | Reick | .................... | B60K 6/365 |
| 2018/0037104 A1 | 2/2018 | Ai et al. | | |

FOREIGN PATENT DOCUMENTS

| | | | | |
|---|---|---|---|---|
| DE | 10 2008 042 682 B4 | 4/2009 | | |
| DE | 102007051506 A1 * | 4/2009 | ............... | B60K 6/40 |
| DE | 102008052257 A1 * | 4/2010 | ............. | B60K 6/365 |
| DE | 102009059935 A1 * | 6/2011 | ........... | F16H 37/084 |
| DE | 10 2011 085 149 A1 | 4/2013 | | |
| DE | 10 2016 117 602 A1 | 4/2017 | | |
| WO | WO-2011076311 A * | 6/2011 | ............. | B60K 6/387 |
| WO | WO 2014/039447 A1 | 3/2014 | | |

OTHER PUBLICATIONS

German Search Report issued in German counterpart application No. 10 2017 217 133.2 dated May 8, 2018, (Seven (7) pages).

\* cited by examiner

AUTOMATIC TRANSMISSION FOR A MOTOR VEHICLE AND METHOD FOR SHIFTING AN AUTOMATIC TRANSMISSION

CROSS REFERENCE TO RELATED APPLICATIONS

This application is a continuation of PCT International Application No. PCT/EP2018/072467, filed Aug. 21, 2018, which claims priority under 35 U.S.C. § 119 from German Patent Application No. 10 2017 217 133.2, filed Sep. 26, 2017, the entire disclosures of which are herein expressly incorporated by reference.

BACKGROUND AND SUMMARY OF THE INVENTION

The invention relates to an automatic transmission for a motor vehicle with an internal-combustion engine, and also to a method for shifting such an automatic transmission.

Automatic transmissions for motor vehicles are known. Furthermore, automatic transmissions are known for hybrid electric vehicles which, in addition to an internal-combustion engine, additionally have at least one electric machine for the drive. Current automatic transmissions for hybrid electric vehicles (hybrid transmissions) are based, as a rule, on existing automatic transmissions. The electric machine for the electrification is conventionally positioned between the internal-combustion engine and the transmission (so-called P2 hybrid). However, this type of hybridization does not afford any advantages for the transmission as such.

Transmissions that are suitable for hybridizing are, for instance, load-switchable automatic transmissions which provide the various fixed gear-ratio stages via frictionally engaged shifting elements. In these transmissions, at least one shifting element is operated subject to slippage during the change of gear. In the process, the work of friction during slippage operation is converted into heat which has to be transported away from the frictionally engaged shifting elements with the aid of a sufficient stream of cooling oil. Moreover, the frictionally engaged shifting elements in the open state generate corresponding drag losses. The shifting elements are driven, as a rule, hydraulically. In order that they are able to transmit power in the closed state, the friction plates of the shifting elements have to be pressed against one another permanently with an appropriately high hydraulic pressure. The hydraulic pump necessary for this is employed both for cooling and for actuating the shifting elements. However, the pump requires a certain power for its operation, as a result of which the overall efficiency declines.

It is an object of the invention to provide an improved automatic transmission for hybrid motor vehicles. A further object of the invention is to provide a method for operating such an automatic transmission.

For the purpose of achieving the object, an automatic transmission for a motor vehicle with an internal-combustion engine is provided, having at least two fixed gear-ratio stages, a transmission shaft, an epicyclic gear mechanism, a shaft, two shifting elements and a variator. A first side of the variator is capable of being coupled in torque-transmitting manner with the transmission shaft, and a second side of the variator is capable of being coupled in gear-ratio-adjusting manner with the epicyclic gear mechanism via the shaft. This means that the second side of the variator is in a 3-shaft mode together with the internal-combustion engine and a power take-off of the automatic transmission, as a result of which the second side of the variator has a gear-ratio-adjusting effect on the internal-combustion engine via the epicyclic gear mechanism. In this connection, the variator makes a continuous gear-ratio adjustment possible. Consequently, further gear ratios, in particular arbitrary intermediate states between the fixed gear-ratio stages, can be set independently of the fixed gear-ratio stages. A gear-ratio stage is, in particular, a gear of the automatic transmission.

According to one embodiment, the variator is constituted by two electric machines. In this case, one of the electric machines is operated as a generator, and the other electric machine is operated as a motor. By kinetic energy being temporarily converted into electrical energy, the rotational speeds of the two electric machines can be decoupled, and hence a variator functionality can be provided with the two electric machines.

The epicyclic gear mechanism may be a planetary gear mechanism.

In one embodiment, the shifting elements are positive shifting elements. This has the advantage that the shifting elements can be held in the closed position with slight pressure. Consequently, the energy consumption for preserving the fixed gear-ratio stages can be lowered, and hence the overall efficiency can be increased. In addition, (almost) no drag losses arise in the open state.

According to another embodiment, the first shifting element is provided for engaging the first fixed gear-ratio stage, and the second shifting element is provided for engaging the second fixed gear-ratio stage. This means that a preferentially separate shifting element has been assigned to each fixed gear-ratio stage, by means of which the gear-ratio stage is engaged and, in particular, kept closed. Alternatively, several shifting elements for engaging a fixed gear-ratio stage, and/or individual shifting elements for engaging several fixed gear-ratio stages, may also have been provided.

The invention further provides a method for shifting an automatic transmission, in particular an automatic transmission according to the invention, between at least two different fixed gear-ratio stages, with the following sequence of steps:

a) the shifting element of the currently engaged fixed gear-ratio stage is set to no-load by the variator by means of a superposition of torque within the transmission, b) the shifting element of the currently engaged fixed gear-ratio stage is opened;

c) the target gear-ratio stage is set by a gear-ratio adjustment of the variator, as a result of which the difference in rotational speed relative to the shifting element to be closed is simultaneously reduced; and d) the shifting element of the target gear-ratio stage is closed, as a result of which the shifting element can take over the load from the variator.

In this way, switching can be effected between two fixed gear-ratio stages, and at the same time the tractive force can be preserved. In this case, only during the shifting between the fixed gear-ratio stages does power flow across the variator which conventionally has inferior efficiency in comparison with a purely mechanical power transmission. In particular, no power flows across the variator when a fixed gear-ratio stage has been engaged. By the corresponding shifting elements providing the power transmission of the fixed gear-ratio stages, the automatic transmission is able to have high efficiency by this means.

In the case of the shifting method, a first side of the variator may have been coupled in torque-transmitting manner with the transmission shaft at least intermittently, in order to feed a torque into the transmission or to abstract it.

Furthermore, a second side of the variator may have been coupled in gear-ratio-adjusting manner with the epicyclic gear mechanism at least intermittently via the shaft. This means that the second side of the variator has a gear-ratio-adjusting effect on the internal-combustion engine via the epicyclic gear mechanism, in particular by the second side of the variator being in a 3-shaft mode together with the internal-combustion engine and a power take-off of the automatic transmission.

According to one embodiment, in step c) the target gear-ratio stage is set by a continuous gear-ratio adjustment of the variator.

There may be provision that the variator is acted upon only by a fraction of the power of the internal-combustion engine—that is to say, less than 100% of the power of the internal-combustion engine.

Further advantages and features result from the following description in conjunction with the appended drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
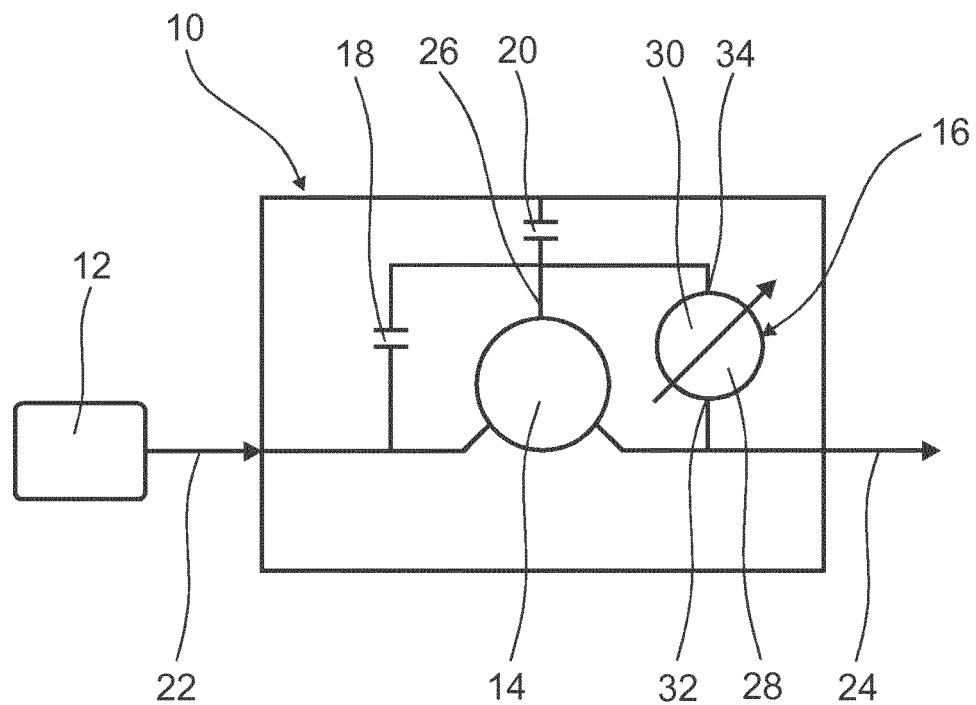
FIG. 1 shows in a schematic representation, an automatic transmission according to the invention with a first and a second gear-ratio stage.

In FIG. 1 an automatic transmission 10 with two fixed gear-ratio stages for a motor vehicle with an internal-combustion engine 12 is shown. The number of two gear-ratio stages serves here only for better clarity; in practice, a higher number of gear-ratio stages may also be used.

The automatic transmission 10 includes an epicyclic gear mechanism 14 in the form of a power-branching planetary gear mechanism, a variator 16 and also a first shifting element 18, which is provided for engaging a first fixed gear-ratio stage in the automatic transmission 10, and a second shifting element 20, which is provided for engaging a second fixed gear-ratio stage in the automatic transmission 10. Furthermore, the automatic transmission 10 includes two transmission shafts, namely an input shaft 22 in the form of a drive shaft, by means of which the automatic transmission 10 is coupled in torque-transmitting manner with the internal-combustion engine 12, and an output shaft 24 in the form of a power-take-off shaft, by means of which the automatic transmission 10 is coupled in torque-transmitting manner with the wheels of the motor vehicle.

If the automatic transmission 10 has three or more fixed gear-ratio stages, it also has a corresponding number of shifting elements 18, 20 which are provided for engaging an associated gear-ratio stage. Alternatively, individual shifting elements 18, 20 may have been provided for several gear-ratio stages, and/or a combination of several shifting elements 18, 20 may have been provided for one gear-ratio stage.

The epicyclic gear mechanism 14 is coupled in torque-transmitting manner both with the input shaft 22 and with the output shaft 24. Moreover, the epicyclic gear mechanism 14 includes a shaft 26 via which, by means of the first shifting element 18 which here constitutes a clutch, the epicyclic gear mechanism 14 is capable of being coupled in torque-transmitting manner with the input shaft 22 and also capable of being coupled in torque-transmitting manner with the second shifting element 20 which here constitutes a brake. The shaft 26 in this case has a speed-setting effect on the internal-combustion engine 12. In an alternative embodiment, the shifting elements 18, 20 may have been provided for arbitrary torque-transmitting functions.

The shifting elements 18, 20 each take the form of a dog clutch. That is to say, they are positive shifting elements and require merely a slight pressure in order to be held in the closed position. In an alternative embodiment, the shifting elements 18, 20 may be any other suitable shifting elements, for instance force-closed shifting elements.

The variator 16 comprises a first electric machine 28 and a second electric machine 30. The variator functionality is provided by one of the electric machines 28, 30 being operated as a generator and by the other electric machine 28, 30 being operated as a motor. By this means, kinetic energy and electrical energy can be converted into one another, and hence the rotational speeds of the two electric machines 28, 30 can be decoupled from one another.

The variator 16 is furthermore capable of being coupled in torque-transmitting manner on a first side 32 with the output shaft 24 and capable of being coupled in torque-transmitting manner on a second side 34 with the shaft 26 and consequently with the epicyclic gear mechanism 14.

In an alternative embodiment, the first side 32 of the variator 16 may be capable of being coupled in torque-transmitting manner with the input shaft 22, with another rotating transmission shaft, or with its own drive axle.

By the input shaft 22, the output shaft 24 and the shaft 26 being operated in a 3-shaft mode, the gear ratio can be adjusted or set by means of the second side 34 of the variator 16.

The motor vehicle may be a hybrid electric vehicle, in which case, in particular, at least one of the electric machines 28, 30 may have been provided for the purpose of driving the hybrid electric vehicle.

The shifting of the automatic transmission 10 from one fixed gear-ratio stage into another fixed gear-ratio stage is effected in accordance with the following method, which will be described with reference to FIGS. 2 to 4 as an example of the shifting from the first gear-ratio stage into the second gear-ratio stage. The method works analogously for the purpose of shifting from the second gear-ratio stage into the first gear-ratio stage or, in the case of an automatic transmission 10 with more than two fixed gear-ratio stages, from one arbitrary gear-ratio stage into another arbitrary gear-ratio stage.

Figure 2:
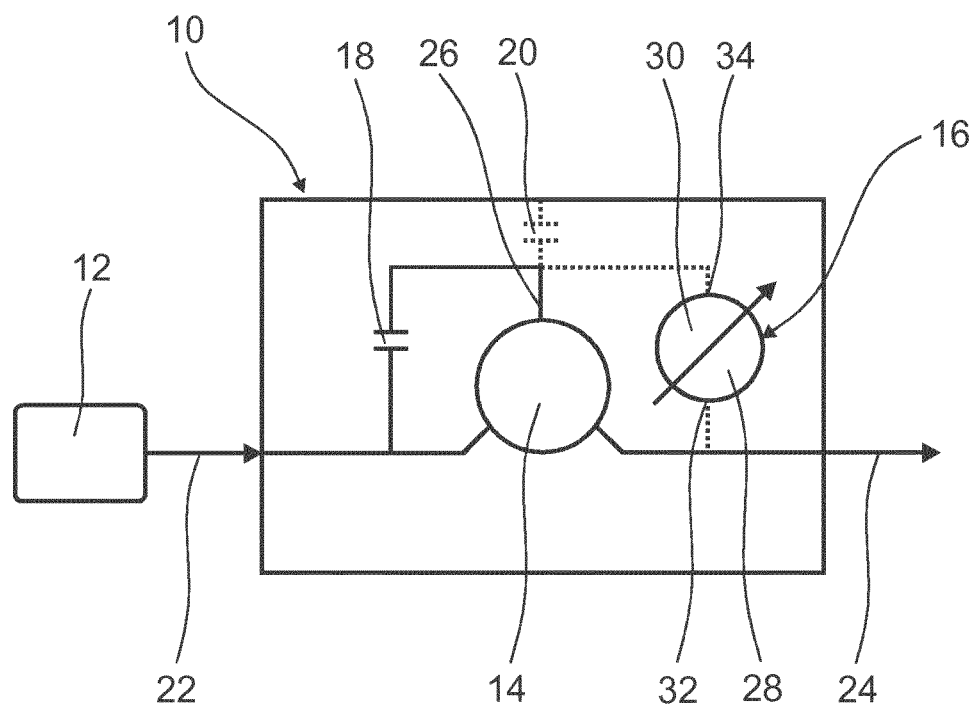
FIG. 2 shows in a schematic representation, the automatic transmission from FIG. 1 with first gear-ratio stage engaged.

In FIG. 2 the first fixed gear ratio has been engaged—that is to say, the first shifting element 18 is closed and the second shifting element 20 is open. Furthermore, the variator 16 has been decoupled. This means that the variator 16 is not coupled in torque-transmitting manner either with the input shaft 22 or with the output shaft 24.

Figure 3:
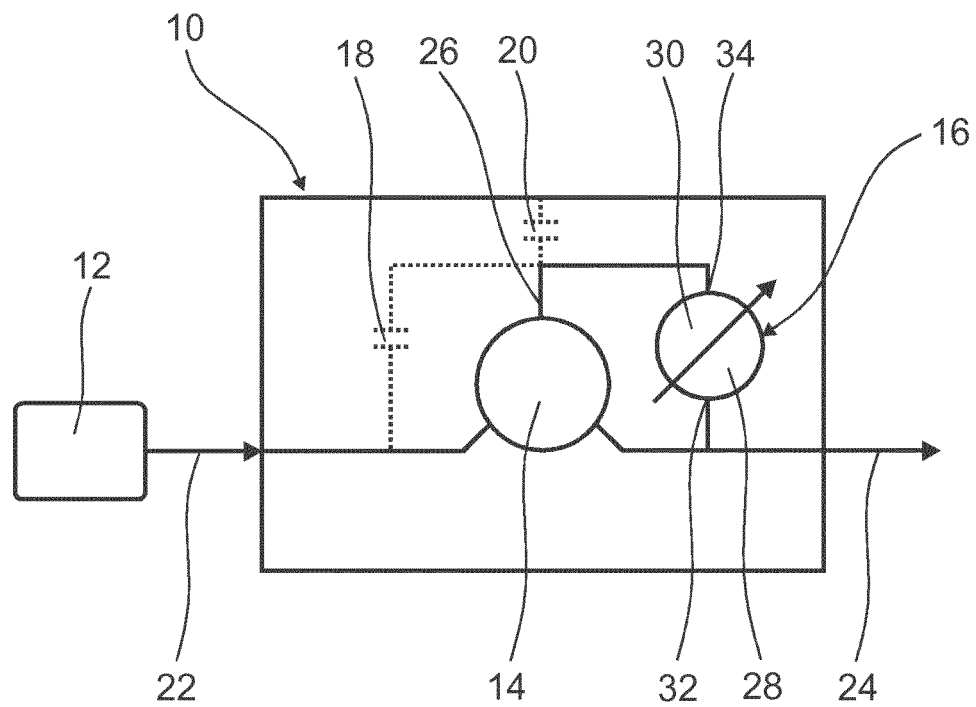
FIG. 3 shows in a schematic representation, the automatic transmission from FIG. 1 in a shifting state.
Figure 4:
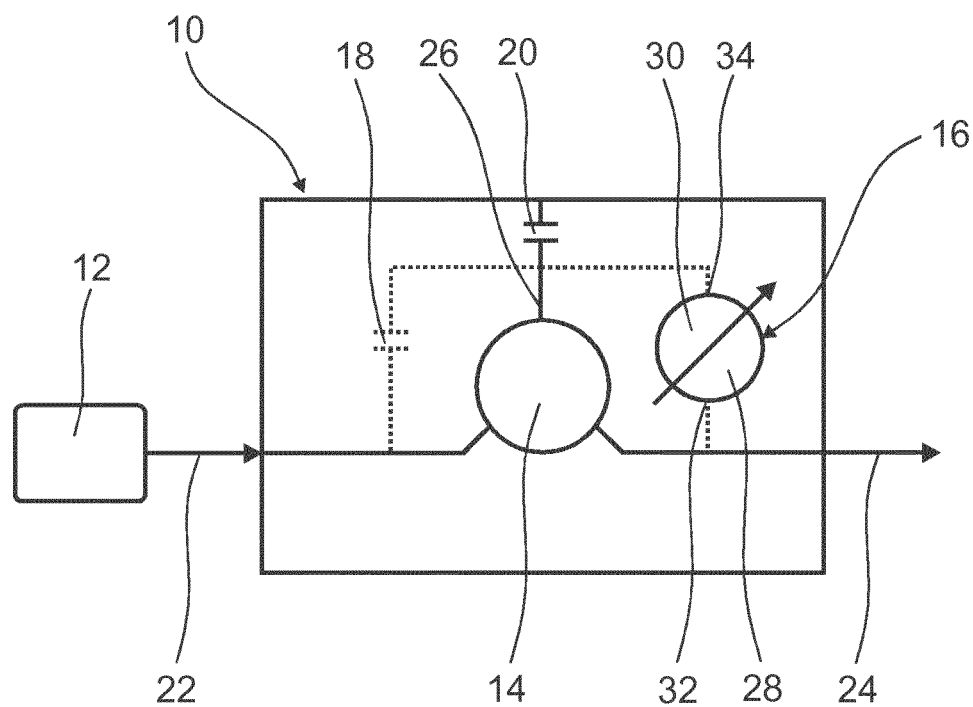
FIG. 4 shows in a schematic representation, the automatic transmission from FIG. 1 with second gear-ratio stage engaged.

In order to shift into the second fixed gear ratio, the variator 16 is now coupled in torque-transmitting manner with the output shaft 24 and also coupled in torque-transmitting manner with the epicyclic gear mechanism 14 via the shaft 26 (see FIG. 3).

By means of the variator 16, via the output shaft 24 the first shifting element 18 is now made load-free by a superposition of torque. That is to say, depending upon whether the torque has to be increased or decreased for this purpose, by means of the first side 32 of the variator 16 an appropriate torque is fed into the transmission or abstracted from the transmission. Consequently, the first shifting element 18 can be opened without influencing the power take-off.

In this case, the requisite rotational speed of the first side 32 is capable of being calculated directly from the drive or from the power take-off. Alternatively, the requisite rotational speed of the first side 32 can be ascertained from a combination of the drive and the power take-off.

After the opening of the first shifting element 18, the gear ratio of the second gear-ratio stage is set by a continuous gear-ratio adjustment of the variator 16. This means that the input shaft 22, the output shaft 24 and the shaft 26 are operated in the 3-shaft mode, as a result of which the gear ratio is matched to the gear ratio of the second gear-ratio stage via the second side 34 of the variator 16. In this way, the difference in rotational speed at the second shifting element 20 is reduced.

As soon as the difference in rotational speed has been reduced to zero or has fallen below a certain limiting value, the second shifting element 20 is closed. By this means, the second shifting element 20 takes over the load from the variator 16, and the variator 16 can be decoupled (see FIG. 4).

Consequently, the automatic transmission 10 has been shifted from the first fixed gear ratio into the second fixed gear ratio, in the case of which the second shifting element 20 is closed and the first shifting element 18 is open.

In this way, a power flows across the variator 16 only in the course of shifting from one fixed gear-ratio stage into another. Furthermore, the variator 16 is acted upon only by a fraction of the power of the internal-combustion engine 12 by virtue of the branching of power of the planetary gear sets of the epicyclic gear mechanism 14.

It is advantageous in this version that the energy within the automatic transmission 10 and hence the output torque are preserved. Furthermore, arbitrary intermediate states can also be set independently of the fixed gear-ratio stages.

In this case, in which the variator 16 is constituted by two electric machines 28, 30, at most one of the electric machines 28, 30 is stationary in the various operating states, as a result of which the other one can be utilized for hybrid functions.

By virtue of this shifting method, positive shifting elements 18, 20 can be used that are involved only in the formation of a gear ratio and not in the actual change of gear ratio. Consequently, the automatic transmission 10 with the shifting method offers the following advantages:

no drag losses arise in the open state of the shifting elements 18, 20, no evolution of heat occurs during the shifting, and the hydraulic requirements for keeping the shifting elements 18, 20 closed are reduced, since no permanent pressure or at least only a very slight pressure has to be applied for the purpose of keeping the respective shifting elements 18, 20 closed.

Consequently the energy consumption of the automatic transmission 10 is lowered, as a result of which the transmission can have improved efficiency.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An automatic transmission for a motor vehicle with an internal-combustion engine, comprising:
    at least a first fixed gear-ratio stage and a second fixed gear-ratio stage;
    a first transmission shaft which is a drive shaft that is coupleable in a torque-transmitting manner with the internal combustion engine;
    a second transmission shaft which is a power-take-off shaft that is coupleable in a torque-transmitting manner with a wheel of the motor vehicle;
    a first shifting element engageable with the first fixed gear-ratio stage;
    a second shifting element engageable with the second fixed gear-ratio stage;
    an epicyclic gear mechanism coupled in a torque-transmitting manner with both the first transmission shaft and the second transmission shaft, wherein the epicyclic gear mechanism includes a shaft, wherein via the shaft the epicyclic gear mechanism is coupleable in a torque-transmitting manner with the first transmission shaft by the first shifting element, and wherein via the shaft the epicyclic gear mechanism is coupleable in a torque-transmitting manner with the second shifting element; and
    a variator, wherein a first side of the variator is coupleable in a torque-transmitting manner with the second transmission shaft and wherein a second side of the variator is coupleable in a gear-ratio-adjusting manner with the epicyclic gear mechanism via the shaft.

2. The automatic transmission according to claim 1, wherein the variator is comprised of two electric machines.

3. The automatic transmission according to claim 1, wherein the epicyclic gear mechanism is a planetary gear mechanism.

4. The automatic transmission according to claim 1, wherein the two shifting elements are positive shifting elements.

5. A method for shifting the automatic transmission according to claim 1, comprising the acts of:
    a) the shifting element of a currently engaged fixed gear-ratio stage is set to no-load by the variator by a superposition of torque within the automatic transmission;
    b) the shifting element of the currently engaged fixed gear-ratio stage is opened;
    c) a target fixed gear-ratio stage is set by a gear-ratio adjustment of the variator; and
    d) the shifting element of the target fixed gear-ratio stage is closed.

6. The method according to claim 5, wherein the first side of the variator is coupled in the torque-transmitting manner with the second transmission shaft at least intermittently.

7. The method according to claim 5, wherein the second side of the variator is coupled in the gear-ratio-adjusting manner with the epicyclic gear mechanism at least intermittently via the shaft.

8. The method according to claim 5, wherein in act c) the target fixed gear-ratio stage is set by a continuous gear-ratio adjustment of the variator.

9. The method according to claim 5, wherein the variator is acted upon only by a fraction of a power of the internal-combustion engine.

\* \* \* \* \*